(12) United States Patent
Jones et al.

(10) Patent No.: US 8,313,602 B2
(45) Date of Patent: Nov. 20, 2012

(54) METHOD OF PRODUCING LIGHT WEIGHT PROTECTIVE HELMETS FOR MILITARY AND OTHER USES

(75) Inventors: Brian H. Jones, San Gabriel, CA (US); Michael James McElroy, Gilbert, AZ (US); Valent Horvatich, Scottsdale, AZ (US); Jeffrey A. Mears, Chandler, AZ (US); Lisa Owen, Charlotte, NC (US)

(73) Assignee: BAE Systems Aerospace & Defense Group Inc., Phoenix, AZ (US)

( * ) Notice: Subject to any disclaimer, the term of this patent is extended or adjusted under 35 U.S.C. 154(b) by 0 days.

(21) Appl. No.: 13/005,019

(22) Filed: Jan. 12, 2011

(65) Prior Publication Data

US 2012/0175046 A1    Jul. 12, 2012

(51) Int. Cl.
*B65H 81/00* (2006.01)

(52) U.S. Cl. ........ 156/189; 156/184; 156/186; 156/187; 156/193; 156/194

(58) Field of Classification Search .................. 156/166, 156/169, 170, 171, 173, 186, 189, 190, 191, 156/194; 264/45.2
See application file for complete search history.

(56) References Cited

U.S. PATENT DOCUMENTS

| | | | | |
|---|---|---|---|---|
| 2,448,114 A | * | 8/1948 | Olson et al. | 156/189 |
| 3,479,666 A | * | 11/1969 | Webb | 2/6.6 |
| 4,639,387 A | * | 1/1987 | Epel | 428/113 |
| 4,656,674 A | | 4/1987 | Medwell | |
| 4,778,638 A | | 10/1988 | White | |
| 5,659,480 A | * | 8/1997 | Anderson et al. | 700/186 |
| 7,228,571 B2 | | 6/2007 | Cheese | |
| 2005/0017911 A1 | * | 1/2005 | Lee | 343/718 |
| 2008/0142151 A1 | | 6/2008 | Busch | |
| 2010/0166994 A1 | | 7/2010 | Marissen | |

FOREIGN PATENT DOCUMENTS

EP    2 151 312 A1    2/2010

OTHER PUBLICATIONS

Campbell et al., "Hybrid Thermoplastic Composite Ballistic Helmet Fabrication Study," Society for the Advancement of Material and Process Engineering, 11 pages, © 2008 by Fiberforge Corporation.*
Burkhart et al., "Feasibility of Continuous-Fiber Reinforced Thermoplastic Tailored Blanks for Automotive Applications," 2005 SPE Automotive Composites Conference & Exposition, Troy, Michigan, 2005, 9 pages.

(Continued)

*Primary Examiner* — Khanh P Nguyen
*Assistant Examiner* — Carson Gross
(74) *Attorney, Agent, or Firm* — Patterson Thuente Christensen Pedersen, P.A.

(57) ABSTRACT

Methods for manufacturing a protective helmet for the military and other uses are disclosed. Embodiments of the method include winding ballistic-tolerant tape or fibers to create a preform, placing the preform into a first mold member having an interior that defines a helmet-shaped cavity, and pressing together the first mold member against a second mold member that includes a pressurized bladder member. The method may further include pressurizing the bladder until the first and second mold members are heated and adhesives have melted or cured. The first and second mold members are cooled and the preform is removed from the first and second mold members.

16 Claims, 6 Drawing Sheets

OTHER PUBLICATIONS

Campbell et al., "Hybrid Thermoplastic Composite Ballistic Helmet Fabrication Study," Society for the Advancement of Material and Process Engineering, 11 pages, copyright 2008.

Walsh et al., "The Development of a Hybrid Thermoplastic Ballistic Material with Application to Helmets", Army Research Laboratory, Dec. 2005, 39 pages.

Hsiao, "Numerical Analysis and Optimal Design for Composite Thermoforming Process", Department of Mechanical Engineering and Applied Mechanics, The University of Michigan, Mar. 25, 1997, 30 pages.

International Search Report and Written Opinion, International Application No. PCT/US2012/020968, mailed Aug. 30, 2012, 8 pgs.

* cited by examiner

METHOD OF PRODUCING LIGHT WEIGHT PROTECTIVE HELMETS FOR MILITARY AND OTHER USES

FIELD OF THE INVENTION

The present invention relates to a method of manufacturing protective helmets for military personnel and other uses. More specifically, the method involves a method of manufacturing helmets having a reduced weight and enhanced ballistic performance.

BACKGROUND OF THE INVENTION

Various methods for manufacturing ballistic helmets are widely known. Following WWII, metal military helmets began to be largely replaced by helmets made of plastics combined with various other materials. Some helmets began utilizing aramid fiber materials for their ballistic and lightweight properties, for example. Woven aramid fiber materials were often pattern cut and molded into helmets. Composite helmets were made using pieces of fabric impregnated with resin or other ballistic sheet material where the fabric was cut into shapes and then arranged in a mold subjected to heat and pressure. In general, these types of processes were time consuming and resulted in significant quantities of costly scrap material.

One past method of making ballistic helmets included making a laminated ballistic helmet from plural, continuous filament resin-coated layers, as set forth in U.S. Pat. No. 4,199,388 to Tracy et al. This type of operation produced multiple helmet-shaped preforms which could be stacked together and molded in a heated metal compression mold.

In other specific examples, composite helmets were formed from impregnated fabric cut into a pinwheel shape where crowns of the pinwheel were placed on top of one another such that their petals were in staggered relationship. The preform was placed in a heated mold subjected to compression and heat to form a helmet. Other methods attempted to improve this technique by more efficient cutting of the fabric, such as along a zig-zag line according to the method discussed in U.S. Pat. No. 4,656,674 to Medwell. Similarly, U.S. Pat. No. 4,778,638 to White taught making a helmet by layering hexagonal blanks in a mold to form plies.

U.S. Pat. No. 7,228,571 to Cheese taught a technique of making a helmet from a sheet of resin-impregnated fabric. This included cutting curved blanks from a sheet, stacking the sheets into a preform, and molding the helmet from the preform.

Recent methods have been described in which flat patterns were cut from the materials chosen for helmet construction. These materials were forced into a steel mold having the outer shape of the helmet by using a punch that defined the interior shape of the helmet. Thermoplastic advanced composites were used in these processes, where reinforcing fibers were embedded in a matrix of thermoplastic resin to offer high specific strength and stiffness and low density. Further, including an inner aramid composite anti-ballistic liner and an outer carbon-fiber-reinforced thermoplastic shell has been suggested as well.

Despite the advances in making protective helmets, most of these processes continue to result in significant quantities of costly wasted material. Manufacturing according to these methods remains time-intensive and labor-intensive in most cases and significant room for improvement exists in helmet design and performance. In addition to the considerable time and labor that was generally involved in attempting such techniques, properly forming the helmet was a challenge. For example, wrinkling of the ballistic material in recent thermoplastic advanced composite methods has been a problem as well as ensuring that helmets have a uniform or desired thickness.

Accordingly, advances in the area of military helmet technology continue to be desired as such equipment can be vital to the safety of persons, including armed forces located around the world. Moreover, improved helmets, including those with enhanced ballistic performance, greater ease of manufacture, reduced weight and more uniform and effective structural properties are widely sought.

SUMMARY OF THE INVENTION

The present invention is generally directed to methods for manufacturing lightweight protective helmets for military personnel and other uses. Embodiments of the invention generally include the steps of winding a high strength structure, dividing the structure into two helmet-shaped preforms, molding a preform using a mold and pressurized bladder device, and cooling and removing the preform helmet structure.

In an embodiment of the invention, a method for manufacturing a protective helmet includes winding ballistic-tolerant tape that has been coated with a thermoplastic or thermosetting adhesive around a solid mandrel to create a spheroid structure and cutting the spheroid structure into two halves, each of said halves providing a preform. Next, the method includes placing one of the preforms into a first mold member having an interior cavity that defines the outside surface of a helmet. The first mold member and a second mold member are then pressed together. The second mold member includes a bladder that projects from the remainder of the second mold member. Moreover, the bladder is sized to engage the preform located in the interior cavity of the first mold when the first mold member and the second mold member are pressed together. The method also includes pressurizing the bladder with a heated fluid and heating the first and second mold members until the adhesive has melted or cured. Once the melting or curing has taken place the first and second mold members are cooled, typically by the use of water. Finally, a molded preform is removed from the first and second mold members.

In another embodiment of the invention, a method for manufacturing a protective helmet includes winding ballistic-tolerant tape that has been coated with a thermoplastic or thermosetting adhesive using a winding machine to create a spheroid structure. The method then includes cutting the spheroid structure into two halves, the halves providing a first preform and a second preform. Next, the first preform is pre-heated with a specially configured microwave oven. Once pre-heated, a first preform is placed into a first mold member having an interior cavity that defines the outside surface of a helmet. The first mold member is then pressed against a second mold member. The second mold member includes an outwardly projecting bladder. Moreover, the bladder is sized to engage first the preform located in the interior cavity of the first mold member when the first mold member and the second mold member are pressed together. The method also includes pressurizing the bladder with a heated fluid such as oil, for example, and heating the first and second mold members until the adhesive has melted or cured. Once the melting or curing has taken place the first and second mold members are cooled. Next, a molded preform is removed from the first and second mold members. Finally, similar preheating and molding operations are repeated on the second preform.

Further embodiments of the invention include a method for manufacturing a protective helmet including winding a first type of ballistic-tolerant tape around a solid mandrel to create a first spheroid structure. The tape used in this method has a thermoplastic or thermosetting adhesive coating. Each of these halves is referred to as a preform. The method also includes winding a second type of ballistic-tolerant tape around the first spheroid structure. After winding, the first spheroid structure is cut into two halves. Each of the halves is referred to as a preform with outer shell structure. The next step of the method includes placing a preform with outer shell structure into a first mold member. Specifically, the first mold member has an interior cavity that defines a helmet. The first mold member is pressed against a second mold member. The second mold member includes a bladder that projects from the second mold member. The bladder is sized to engage the preform with outer shell structure located in the interior cavity of the first mold when the first mold member and the second mold member are pressed together. Next, the bladder is pressurized using a heated fluid and the first and second mold members are heated until the adhesive has melted or cured. The method finally includes cooling the first and second mold members and removing a molded preform and shell structure from the first and second mold members.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Figure 1:
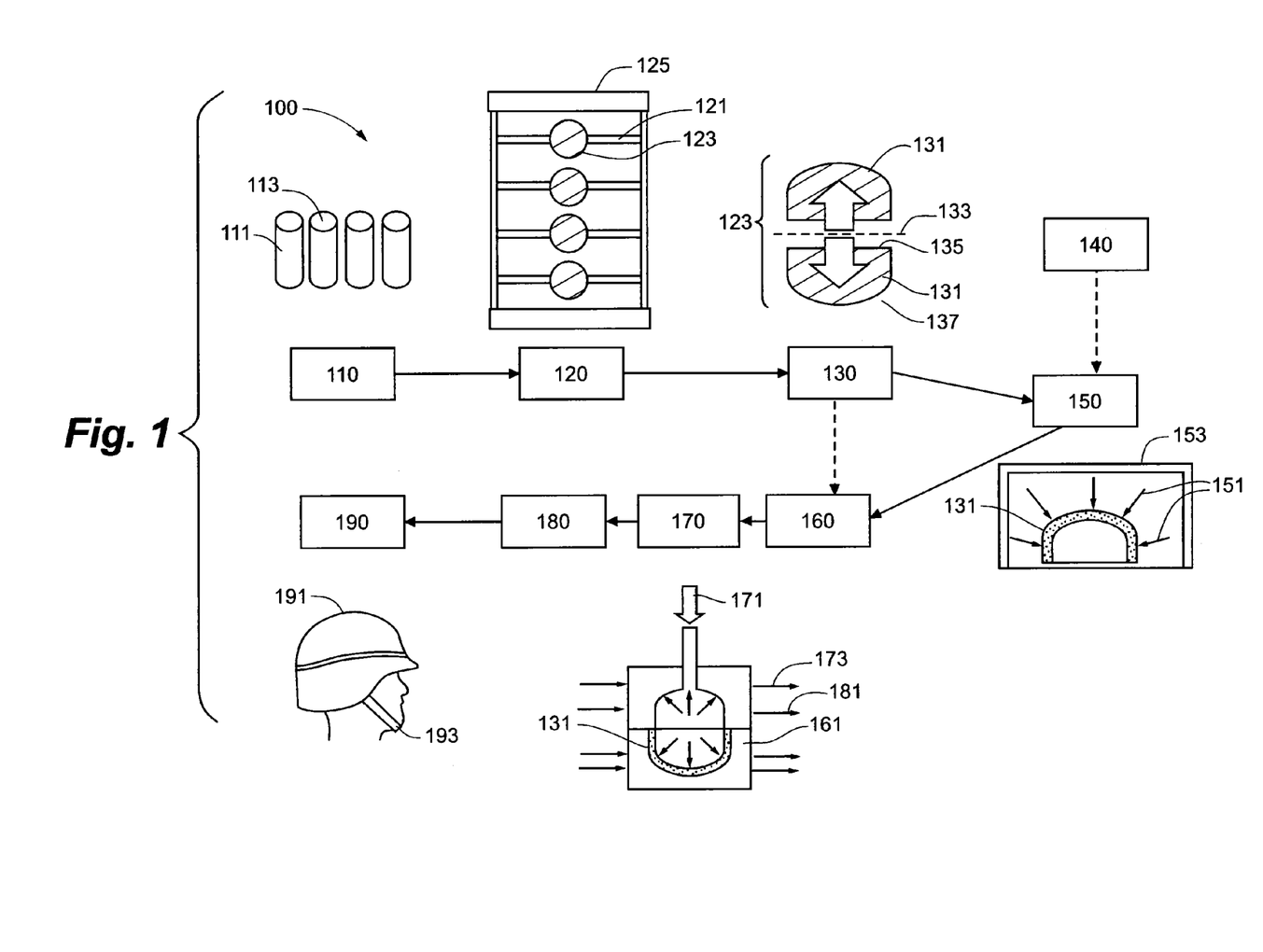
FIG. 1 is a schematic view of the steps in a protective helmet manufacturing method according to an embodiment of the invention.

In its various embodiments, the overall method of manufacturing a lightweight helmet is depicted in the schematic drawing of FIG. 1. The manufacturing process 100 begins with obtaining or otherwise preparing spools of tape or fiber material necessary for fabrication of a head shaped "preform", depicted at 110. The term "tape" used throughout this specification and claims should be read to include tape structures, multifiber bands, or similar materials. This tape 111 is spun into the desired form via a winding process, depicted at 120. The winding process uses a machine 125 to wind ballistic tolerant tape 111 that is coated with thermoplastic or thermosetting adhesive onto a solid mandrel 121 shaped to approximate a spheroid of revolution. The winding results in production of an oblate spheroid structure 123 which can be cut into two equally-spaced performs 131, as shown at step 130.

In some alternative embodiments, a preform 131 may optionally be combined with other high strength fabric performs, like carbon 141 or Kevlar 143 to form an inner or outer shell, as shown at 140. However, in general, the need for using fabric preforms of this type is eliminated due to the capabilities of the winding process 120 which may incorporate any necessary high strength material.

The preform may also optionally be heated via microwaves 151 or similar process as shown at 150. Each preform 131 is then separately placed in a mold 161 and a centrally disposed flexible pressurized bladder 163 is pressed against the inner surface of the preform 131, as represented by step 160. Next, the bladder 163 is pressurized with a heated medium 171 such as oil, as depicted at 170. The mold is further heated with a medium 173 such as steam, oil, or heating elements acting on the mold. Once the adhesive from the perform tape 111 is sufficiently cured or melted, the mold is cooled with a medium 181 such as water and the molded preform is removed. This is represented by step 180 in FIG. 1. The resulting molded preform is a lightweight and durable structure shaped for final finishing and use as a protective or ballistic helmet 191, as depicted at 190. The above preheating and molding operations may be repeated with respect to both preform structures. Further descriptions of embodiments of this manufacturing method are described in greater detail below.

In the manufacturing process, the tape 111 initially used should be provided on cardboard cores or similar structures in a configuration which readily enables use with a winding machine. If the tape material 111 is not supplied in such a configuration, a way wind process may be necessary to adequately wind the materials around cores or spools 113. The cores or spools 113 are often shaped such that they can be mounted onto a spindle of equipment providing tension control for the tape 111. Tensylon and Dyneema are two types of tape with known lightweight and favorable high strength properties that could be provided or prepared for processing. Other high density, high molecular weight polyethylenes or other appropriate materials could also be used. The tape 111 used is ballistic tolerant and has a thermoplastic or thermosetting adhesive coated on one or both sides. In some embodiments, the tape may be 0.5 inches wide, for example.

Figure 2:
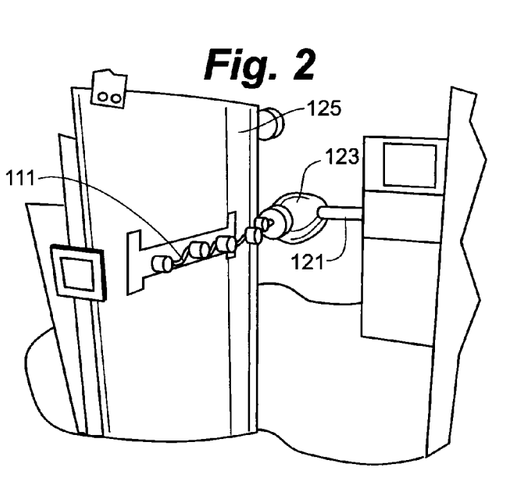
FIG. 2 is a perspective view of a winding machine in the process of winding a preform according to an embodiment of the invention.
Figure 3:
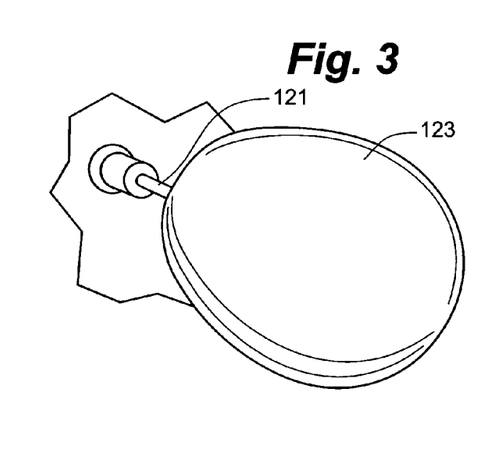
FIG. 3 is a perspective view of a spheroid shaped preform that has been wound into shape according to an embodiment of the invention.

As seen in FIGS. 2 and 3, for the winding portion 120 of the process, a winding machine 125 such as a multi-spindle, preform winding machine having four axes of numerical control may be used. This type of winding machine 125 is typically equipped with four to six spindles. Such a machine is designed to readily wind tape 111 around one of a plurality of solid head-shaped mandrels 121. The mandrels 121 of the winding machine 125 generally contain a shape which approximates a spheroid. The winding machine 125 winds tape 111 via mandrels 121 into a form that reflects the shape of two helmets with perimeter circumference openings placed adjacent one another, and generally approximate an oblate spheroid 123. Accordingly, the material for two helmet preforms 131 is produced at the same time on each mandrel. This tape winding process generally provides an efficient utilization of material as only small amounts of manufacturing material are typically wasted in this process. Because the materials used are generally high-cost, minimizing the amount of discarded material is particularly beneficial, especially in comparison to other current processes which have high buy-to-utilization ratios. It can also be noted that embodiments of the present invention allow the structural properties of the helmet to be readily varied by modifying aspects of the winding machine, if desired. For example, the winding angles and sequences may be changed by simply reprogramming the winding machine 125. Further, different materials may be interspersed in such a process. Modifying the winding sequence in these ways can produce different strength, stiffness, and ballistic behavior of the resulting preform. Moreover, these changes can be made with relative ease and can use same general processing method already being utilized.

Figure 3A:
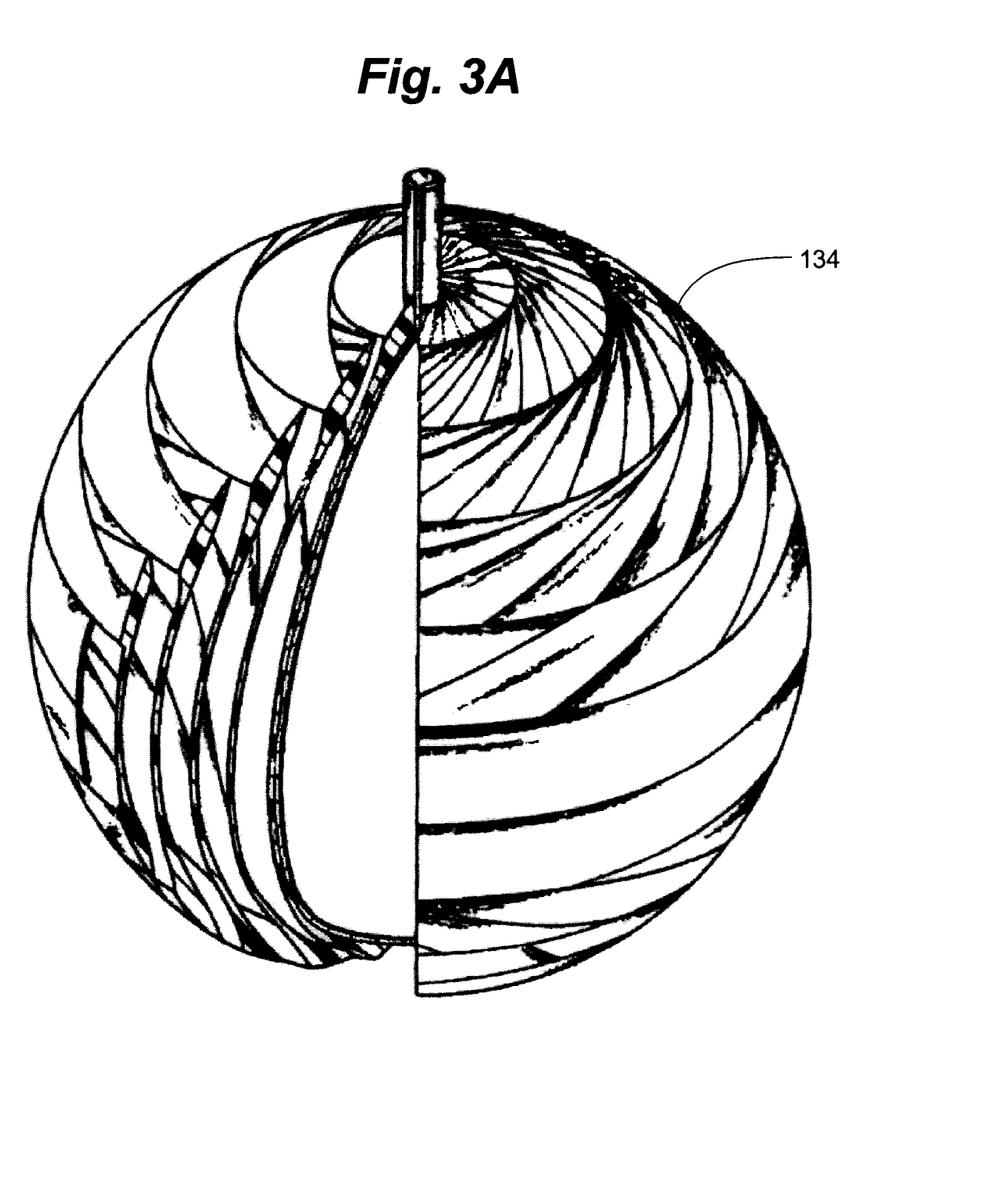
FIG. 3A is a figure depicting an example of a delta-axisymmetric winding pattern.

FIG. 3A shows an example of one known winding pattern that could be generally utilized to construct a structure similar to the oblate spheroid 123. This pattern is referred to as a "delta-axisymmetric" pattern and results in a uniform distribution of fiber orientations and uniform or quasi-uniform total thickness over most of the surface. More specifically, pattern sets of bands are applied equally spaced around the winding or symmetry axis to provide a symmetric pattern. Although the sphere shape 134 illustrated here in FIG. 3A is from U.S. Pat. No. 4,055,233 involving pressure vessels, this type of pattern could be modified to produce the desired oblate spheroid shape for embodiments of the present invention. Various other winding patterns and techniques may be used to produce structures having generally uniform thickness as well. Moreover, the oblate spheroids may be wound using a winding machine using a mandrel that passes through either the spheroid's major or minor axis. Accordingly, the tape is wound such that it is optimally placed for ballistic tolerant properties.

In some embodiments, the winding method may further include crafting an additional outer or inner shell 136 of separate material that can be produced integrally with the preform. This separate material may be carbon, aramid, or glass, for example. An outer shell can be formed by winding tape made of these materials around the other wound tape of the preform during the winding step of the process. Alternatively, materials for an inner shell can be first wound around the mandrel before the material of the preform is wound around it. Constructing an outer or inner shell in this way eliminates the need for separately molding and bonding a shell into position. Removing such steps eliminates cost and complexity from the manufacturing process.

Figure 4:
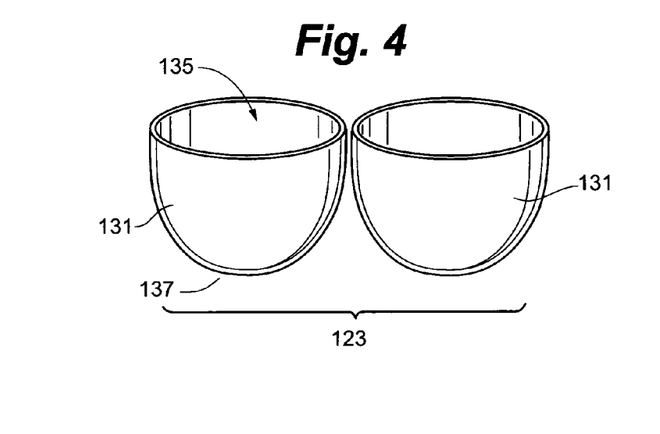
FIG. 4 is a perspective view of the resulting preforms after the spheroid shaped preform has been split in two according to an embodiment of the invention.
Figure 4A:
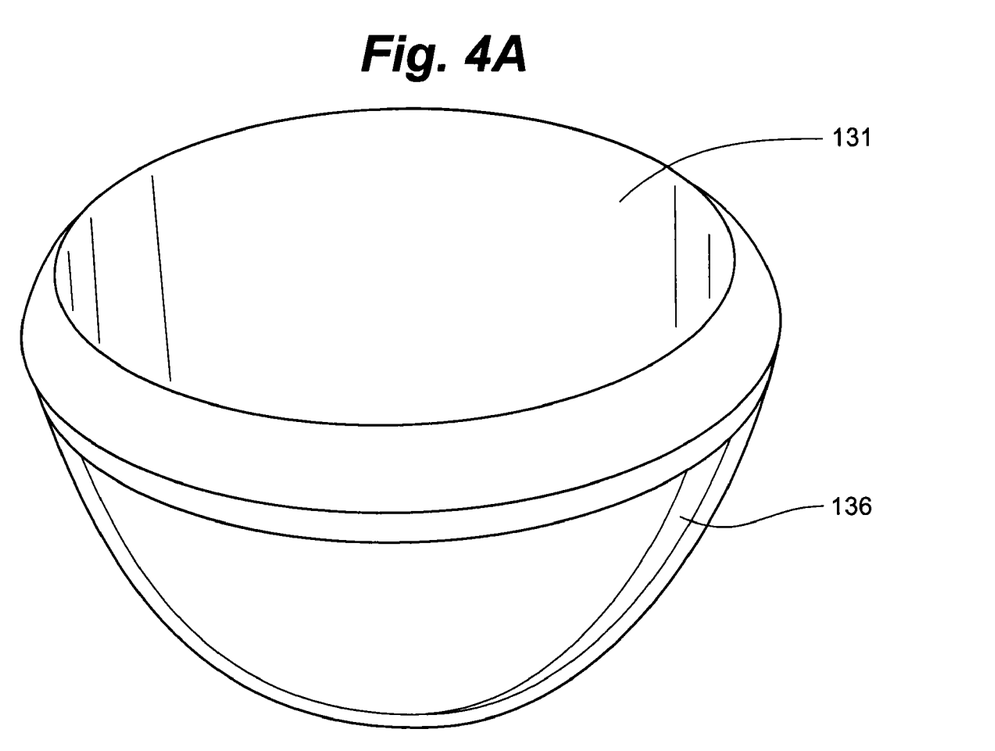
FIG. 4A is a perspective view of a cut preform having an outer shell according to an embodiment of the invention.

Once wound, the oblate spheroid 123 is cut into two generally equal parts along a centrally-disposed split line 133, where each half of the spheroid constitutes a preform 131. An example of a cut spheroid 123 is shown in FIG. 4. This cutting can be done manually or with an automated slitting device. The resulting performs have an open cut end 135, and a closed rounded end 137. An example of a preform 131 having a outer shell 136 of additional wound material is seen in FIG. 4A Next, the preform 131 may be pre-heated in some cases. This may be done in a specially configured microwave oven 153 where the preform is exposed to microwave heating 151 for a period of time sufficient to heat the preform to a desired temperature, such as 130-160° F., for example. Heating the preform is generally done to speed up the next stage of the molding process. By heating the preform before placing it in the mold 161, waiting for conductive heat transfer to occur in the mold before molding begins to take place is no longer necessary. Microwave pre-heating is a preferred method for such heating, although other forms of heating may be possible as well. Preheating is generally not a required step to various embodiments of this invention.

In some embodiments, an additional step 140 of adding fabric preforms from a ply cutter could be incorporated into the molding process. This would involve adding this fabric inside or outside of the molded preform just prior to the pre-heating or molding steps. In these cases, the additional fabric added could be made of carbon or Kevlar, for example. This would be done to provide an inner or outer shell to the helmet that would become an integral part of the preform once the molding steps took place. This step is not typical, cut could be done, however, as an alternative to or in addition to the processes described in this application involving adding material inside or outside of the preform to form a shell as part of the winding process.

Figure 5:
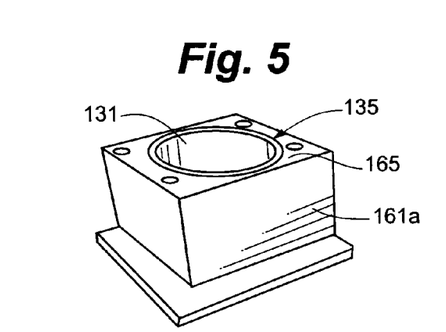
FIG. 5 is a perspective view of a first mold member in which a preform has been placed according to an embodiment of the invention.

After the perform 131 is cut and/or pre-heated and/or combined with fabric, the preform 131 is next placed in the lower half 161a of a two part mold 161. The lower half of the mold 161a has a central cavity defined by an inner surface having the required features for the outside surface of a helmet. When the preform 131 is placed in the mold 161a, the cut top surface 172 of the preform at end 135 should be nearly level with the top 165 of the mold 161a. Split line 169 is shown in the figures across the top 165 of mold part 161a. When the preform 131 is placed in the mold 161a, the preform is oriented such that the open cut end 135 is facing upwardly and is located at the top of the mold 161a. This is shown in FIG. 5.

Next, a specially designed nitrile-rubber containment ring 167 is placed at the split line 169 dividing the mold 161. This is done to prevent the bladder 163 of the top half of the mold 161b from acting on the top surface 172 of the preform 131. In general, the top half of the mold 161b contains a centrally located bladder 163 that is partially disposed in a cavity of the mold 161b. The lower half of the bladder protrudes from the remainder of the mold 161a as a generally rounded projection. The upper half of the bladder is connected within the central cavity of the remainder of the mold 161b and has a centrally located port 174 allowing fluid access to the interior of the bladder from a side or top central location on the mold 161b. The mold 161b is designed to be filled with oil or other suitable material through this port. The top half of the mold 161b is lowered onto the bottom half of the mold 161a such that the bladder extends into the cavity of the lower mold 161a and the outer surface 165 of 161a abuts with the upper surface 166 of 161b when the mold 161 is closed. FIGS. 6 and 8-10 show portions of the mold 161 in several of these configurations, for example.

Figure 6:
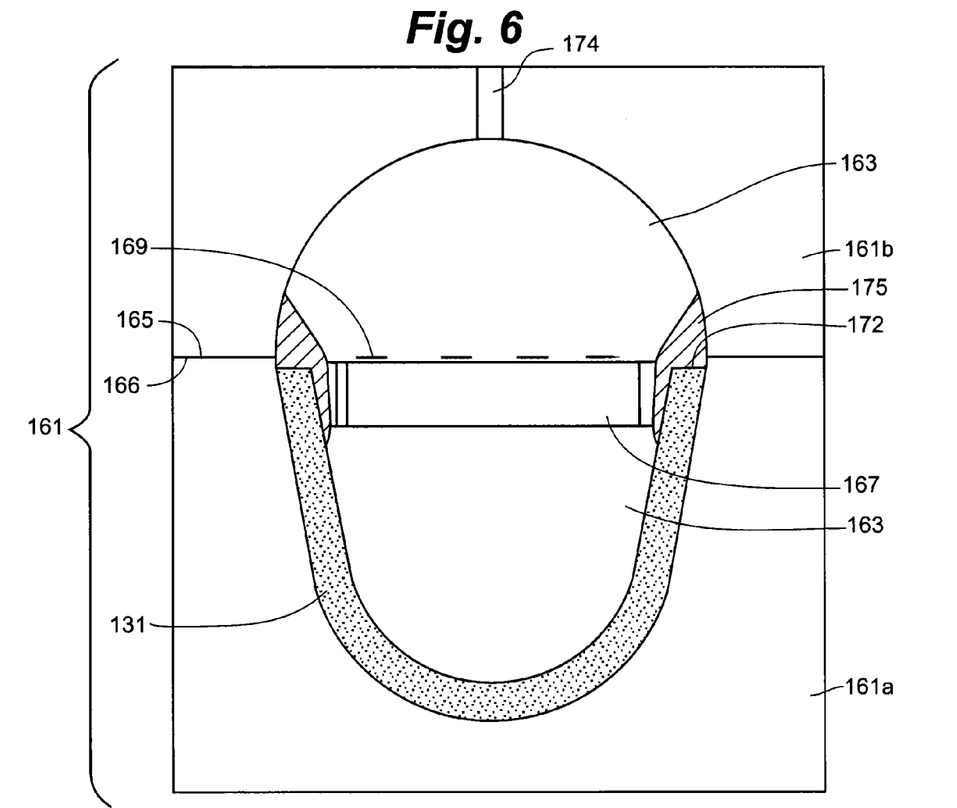
FIG. 6 is a cross-sectional view of the preform in a closed mold structure according to an embodiment of the invention.

A cross-sectional view of the closed mold 161 containing the preform 131 is shown in FIG. 6. As shown, the preform 131 is located between the bottom half of the mold 161a and the bladder 163. The containment ring 167 located at the split line 169 of the top and bottom halves of the mold 161 is shown being pushed radially against a rubber seal 175 surrounding the top surface 173 of the preform 131. This arrangement, including the containment and expansion ring 167, prevents the bladder 163 from pushing down on the preform 131 and causing wrinkles in the final molded preform.

Figure 7:
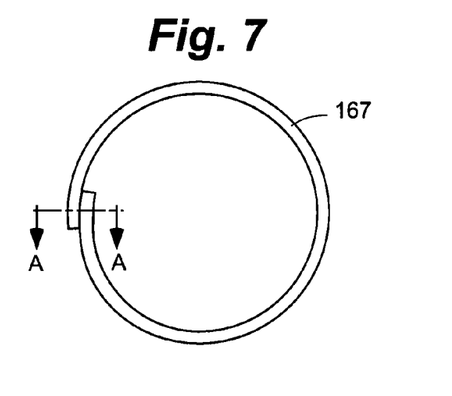
FIG. 7 is a top view of a containment and expansion ring for the mold according to an embodiment of the invention.
Figure 7A:
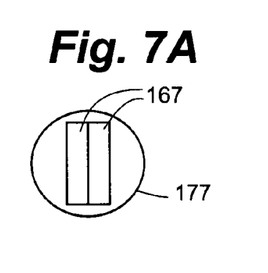
FIG. 7A is a cross-sectional view of the containment and expansion ring of FIG. 7 along the line A-A according to an embodiment of the invention.
Figure 8:
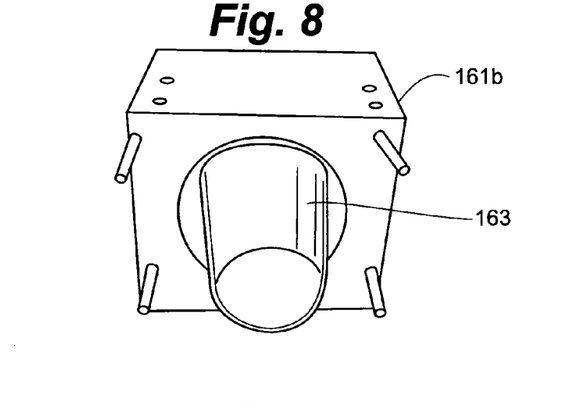
FIG. 8 is a perspective view of a second mold member including a protruding bladder according to an embodiment of the invention.
Figure 9:
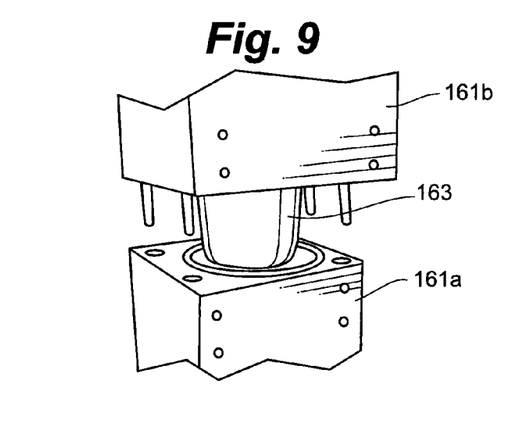
FIG. 9 is a perspective view of a first and second mold member being closed together around a preform according to an embodiment of the invention.

A top cross-sectional view of the containment ring 167 can be seen in FIG. 7. This ring 167 is made of tempered steel and is shaped to overlap at its ends such that it can expand or contract as necessary. The ring 167 may have dimensions such as 1" by 0.03", for example. The ring is also preferably wrapped in a shrink tube 177. FIG. 7A shows a cross-sectional view of the containment ring 167 along line A-A of FIG. 7. The overlapping ring and shrink tube 177 making up the containment ring 167 can be understood from this view. Other methods may be used similar to the containment ring which would enable radial expansion of the bladder to be accommodated while preventing the bladder from acting axially on the top of the preform. One such example may include a plurality of rigid plates joined around a flexible band which allows the plates to be displaced from one another when flexed. Such an arrangement allows for an expandable structure which can accommodate stretching about the perimeter by permitting intervening gaps between the plates.

Next, once the mold 161 is closed, pressure in the range of 100-10,000 psi is applied to the bladder 163 via the port 174 using a suitable pump and a fluid medium 171. The mold 161 and bladder 163 are accordingly pressurized and heated using a medium 171 such as steam, oil, or heating elements. In addition to the bladder, the mold is heated via a hot medium fed through galleries located throughout the mold. This may be done via tubes 179, for example, connected to ports in the top and bottom halves of the mold 161. This can be understood from FIG. 10, for example. This heating is done for a period of time sufficient to raise the temperature of the preform to whatever temperature and time will cause the adhesive or resin in the tape 111 to melt or cure. Because the molded preform 131 is of essentially the desired configuration and laminate architecture, material distortion is minimized during the molding operation. Note that the pressurized bladder allows for a uniform hydrostatic pressure to be exerted on the preform material during molding for consolidation. This is distinct from many conventional processes that utilize a shaped steel punch to force material into a shaped cavity by exerting significant axial pressure but only a small amount of radial pressure. Such past non-uniform pressure processes could result in less than optimal properties for portions of a helmet located away from the top of such a helmet. Note that due to the winding process and pressurized bladder molding technique, only a moderate press is necessary to mold the parts of this way. For example, a 50-ton press could be utilized compared to past molding operation that could require a 500-ton press.

Figure 10:
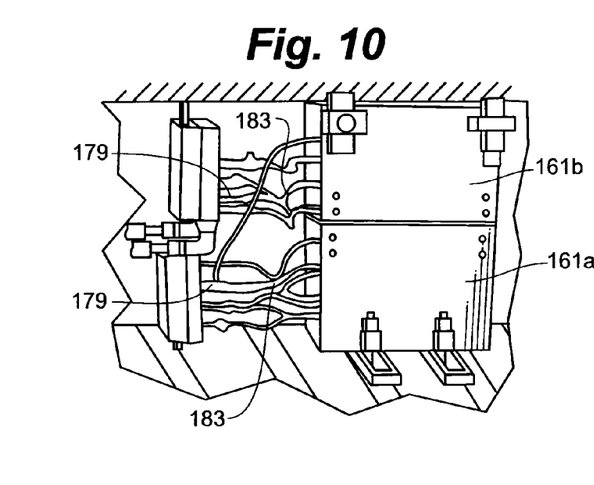
FIG. 10 is a first and second mold member pressed against one another in a closed configuration according to an embodiment of the invention.

Once the adhesive or resin is melted or cured, the next step involves cooling the mold and its contents to an appropriate temperature range using water or other means 181. This is done to allow the adhesive temperature to drop below its melting point and solidify before the mold is removed. Such water or other cooling means generally is fed through galleries located in the mold 161 via ports and tubes 183 extending into these structures. This appropriate temperature range for cooling may be around 100° F. to 130° F., for example. FIG. 10 shows an example of the tubing 183 capable of providing cooling water to the mold.

Figure 11:
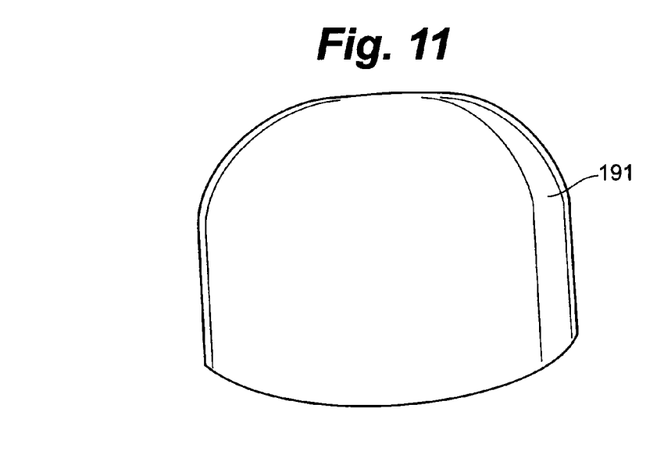
FIG. 11 is a perspective view of a molded preform helmet structure after molding according to an embodiment of the invention.

Finally, the mold 161 is opened and the molded helmet structure 191 is removed from the mold 161 for finishing operations. The helmet structure 191 typically is trimmed to shape and all required holes are drilled. A molded edge may be added to the brim for example. The helmet 191 may be painted and interior fittings such as the chin strap 193 may be attached. Note that the entire preheating and molding operations discussed above may be repeated with respect to both preform structures such that two molded helmet structures result from each spheroid structure 123 that is wound.

It can also be observed that due to the relatively low deformation experienced by the preform, interspersing of laminates for special purposes like antennas or fasteners is facilitated in this overall process. Deformation and high local pressures in other processes do not typically allow for these possibilities. Accordingly, antennas or other useful components could be added to the helmet during preform winding or after the preform winding prior to molding with relative ease. In many desirable configurations, the winding process of the preform may include the steps of briefly stopping the winding machine and inserting an antenna or other desirable insert on a layer of wound material before resuming the winding process. This allows for a helmet with uniquely integrated components. Other desirable inserts may include mounting structures for connection of an interior helmet suspension system, for example.

Overall, the steps constituting embodiments of the present invention are generally robust processes which lend themselves to automation and a high level of repeatability and process control. This is partially due to the fact that the molding process results in essentially no distortion of the material being used to create the preform. This enables desired structural characteristics to be maintained in a repeatable manner. Accordingly, such a process is highly desirable over many past processes which are considered labor intensive and do not lend themselves to automated steps.

The above description is not intended to describe each illustrated embodiment or every implementation of the present invention. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A method for manufacturing a protective helmet, comprising:
   winding a ballistic-tolerant tape, said tape coated with a thermoplastic or thermosetting adhesive, around a solid mandrel to create a spheroid structure;
   cutting the spheroid structure into two halves, each of said halves comprising a preform;
   placing one said preform into a first mold member having an interior cavity that defines an outside surface of a helmet;
   pressing together the first mold member and a second mold member, wherein the second mold member includes a bladder that projects from the second mold member and is sized to engage said preform located in the interior cavity of the first mold member when the first and second mold members are pressed together;
   pressurizing the bladder and heating the first and second mold members until the adhesive has melted or cured;
   positioning a containment and expansion ring around the bladder at a top edge of the preform to prevent the pressurized bladder from acting axially on the top edge of the preform when the preform is located in the mold;

cooling the first and second mold members; and
removing a molded preform from the first and second mold members.

2. The method for manufacturing a protective helmet of claim 1, further including pre-heating the preform before it is placed in the first mold member.

3. The method for manufacturing a protective helmet of claim 2, wherein the pre-heating is done using microwaves.

4. The method for manufacturing a protective helmet of claim 2, wherein the preform structure is pre-heated to a temperature between 130-160° F.

5. The method for manufacturing a protective helmet of claim 1, wherein the containment and expansion ring is made of nitrile rubber and steel.

6. The method for manufacturing a protective helmet of claim 1, wherein winding said ballistic-tolerant tape around a solid mandrel is done with a multiple spindle winding machine with at least four axes of numerical control.

7. The method for manufacturing a protective helmet of claim 1, wherein the pressure in the mold is between 100 and 10,000 psi.

8. The method for manufacturing a protective helmet of claim 1, further including the step of producing a shell for the helmet in which the shell is simultaneously molded with the preform.

9. The method for manufacturing a protective helmet of claim 8, wherein the shell is made of different material than the helmet.

10. The method for manufacturing a protective helmet of claim 8, wherein the shell is made by winding a second layer of tape around the exterior of the spheroid structure after the initial tape winding and prior to molding.

11. The method for manufacturing a protective helmet of claim 8, wherein an antenna is integrated into the preform prior to molding.

12. A method for manufacturing a protective helmet, comprising:
    winding ballistic-tolerant tape using a winding machine to create a spheroid structure, the tape coated with a thermoplastic or thermosetting adhesive;
    cutting the spheroid structure into two halves, the halves comprising a first preform and a second preform;
    pre-heating the first preform with a specially configured microwave oven;
    placing the first preform into a first mold member having an interior cavity that defines an outside surface of a helmet;
    pressing together the first mold member and a second mold member, wherein the second mold member includes a bladder that projects from the second mold member and is sized to engage the first preform located in the helmet of the first mold member when the first and second mold members are pressed together;
    pressurizing the bladder and heating the first and second mold members until the adhesive has melted or cured;
    positioning a containment and expansion ring around the bladder at a top edge of the preform to prevent the pressurized bladder from acting axially on the top edge of the preform when the preform is located in the mold;
    cooling the first and second mold members;
    removing a molded preform from the first and second mold members; and
    preforming preheating and molding operations to the second preform similar to the first preform.

13. The method for manufacturing a protective helmet of claim 12, wherein the containment and expansion ring is made of nitrile rubber and steel.

14. The method for manufacturing a protective helmet of claim 12, further including the step of producing a shell for the helmet in which the shell is simultaneously molded with the preform.

15. A method for manufacturing a protective helmet, comprising:
    winding a first type of ballistic-tolerant tape around a solid mandrel to create a first spheroid structure, the tape coated with a thermoplastic or thermosetting adhesive;
    winding a second type of ballistic-tolerant tape around the first spheroid structure;
    cutting the first spheroid structure into two halves, each of said halves comprising a preform with outer shell structure;
    placing one preform with outer shell structure into a first mold member having an interior cavity that defines an outside surface of a helmet;
    pressing together the first mold member and a second mold member, wherein the second mold member includes a bladder that projects from the second mold member and is sized to engage the preform with outer shell structure located in the interior cavity of the first mold member when the first and second mold members are pressed together;
    pressurizing the bladder;
    positioning a containment and expansion ring around the bladder at a top edge of the preform to prevent the pressurized bladder from acting axially on the top edge of the preform when the preform is located in the mold;
    heating the first and second mold members until the adhesive has melted or cured;
    cooling the first and second mold members; and
    removing a molded preform and shell structure from the first and second mold members.

16. The method for manufacturing a protective helmet of claim 15, wherein the preform with outer shell structure is pre-heated in a microwave device before it is placed in the mold.

* * * * *